United States Patent [19]
Slavenburg et al.

[11] Patent Number: 6,141,675
[45] Date of Patent: Oct. 31, 2000

[54] METHOD AND APPARATUS FOR CUSTOM OPERATIONS

[75] Inventors: Gerrit Ary Slavenburg, Los Altos; Pieter van der Muelen, Sunnyvale, both of Calif.; Yong H. Cho, Princeton, N.J.; Vijay K. Mehra, Freemont; Yen C. Lee, San Jose, both of Calif.

[73] Assignee: Philips Electronics North America Corporation, New York, N.Y.

[21] Appl. No.: 08/706,059

[22] Filed: Aug. 30, 1996

Related U.S. Application Data

[60] Provisional application No. 60/003,140, Sep. 1, 1995, and provisional application No. 60/004,642, Sep. 29, 1995.

[51] Int. Cl.[7] .................................. G06F 7/50; G06F 7/52
[52] U.S. Cl. ........................... 708/706; 712/221; 712/215
[58] Field of Search ....................... 364/787.01; 708/706, 708/710; 712/215, 221

[56] References Cited

U.S. PATENT DOCUMENTS

| | | | |
|---|---|---|---|
| 5,047,975 | 9/1991 | Patti et al. .............................. | 708/706 |
| 5,189,636 | 2/1993 | Patti et al. .............................. | 708/706 |
| 5,390,135 | 2/1995 | Lee et al. ................................. | 708/518 |
| 5,432,728 | 7/1995 | Curtet ..................................... | 708/710 |
| 5,883,824 | 3/1999 | Lee et al. ................................. | 708/445 |
| 5,959,874 | 9/1999 | Lin et al. ................................. | 708/700 |

*Primary Examiner*—Kenneth R. Coulter
*Attorney, Agent, or Firm*—Tony E. Piotrowski

[57] ABSTRACT

Custom operations are useable in processor systems for performing functions including multimedia functions. These custom operations enhance a system, such as PC system, to provide real-time multimedia capabilities while maintaining advantages of a special-purpose, embedded solution, i.e., low cost and chip count, and advantages of a general-purpose processor reprogramability. These custom operations work in a computer system which supplies input data having at least two operand data, performs operations on the operand data, and supplies result data to a destination register.

15 Claims, 12 Drawing Sheets

MEMORY LOCATION n+0 [a b c d]
n+4 [e f g h]    TRANSPOSE → [a e i m]
n+8 [i j k l]                [b f j n]
n+12 [m n o p]               [c g k o]
                             [d h l p]

} FIG. 3a

ROW MAJOR                    COLUMN MAJOR $\begin{bmatrix} a & b & c & d \\ e & f & g & h \\ i & j & k & l \\ m & n & o & p \end{bmatrix}$ TRANSPOSE → $\begin{bmatrix} a & e & i & m \\ b & f & j & n \\ c & g & k & o \\ d & h & l & p \end{bmatrix}$ } FIG. 3b

ROW MAJOR                                                                    COLUMN MAJOR $\begin{bmatrix} a & b & c & d \\ e & f & g & h \\ i & j & k & l \\ m & n & o & p \end{bmatrix}$ → mergemsb → [a e b f] → pack16msb → $\begin{bmatrix} a & e & i & m \\ b & f & j & n \\ c & g & k & o \\ d & h & l & p \end{bmatrix}$
→ mergemsb → [i m j n] → pack16lsb
→ mergelsb → [c g d h] → pack16msb
→ mergelsb → [k o l p] → pack16lsb

IF r1 mergemsb   r10 r11 → r14
IF r1 mergemsb   r12 r13 → r15
IF r1 mergelsb   r10 r11 → r16
IF r1 mergelsb   r12 r13 → r17
IF r1 pack16msb  r14 r15 → r18
IF r1 pack16lsb  r14 r15 → r19
IF r1 pack16msb  r16 r17 → r20
IF r1 pack16lsb  r16 r17 → r21

IF r1 st32d(0)   r101 r18
IF r1 st32d(4)   r101 r19
IF r1 st32d(8)   r101 r20
IF r1 st32d(12)  r101 r21
```

FIG. 5b
```
char matrix [4] [4] ;
            .
            .
            .
int *m = (int *) matrix;

temp0 = MERGEMSB (m[0] , m[1]) ;
temp1 = MERGEMSB (m[2] , m[3]) ;
temp2 = MERGELSB (m[0] , m[1]) ;
temp3 = MERGELSB (m[2] , m[3]) ;

m[0] = PACK16MSB(temp0, temp1) ;
m[1] = PACK16LSB(temp0, temp1) ;
m[2] = PACK16MSB(temp2, temp3) ;
m[3] = PACK16LSB(temp2, temp3) ;
            .
            .
            .
```

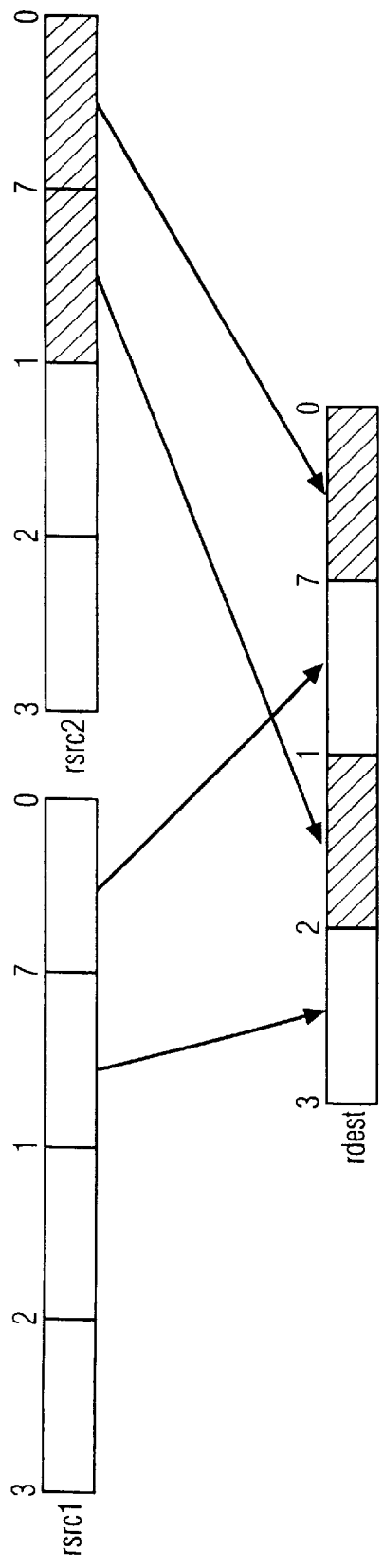
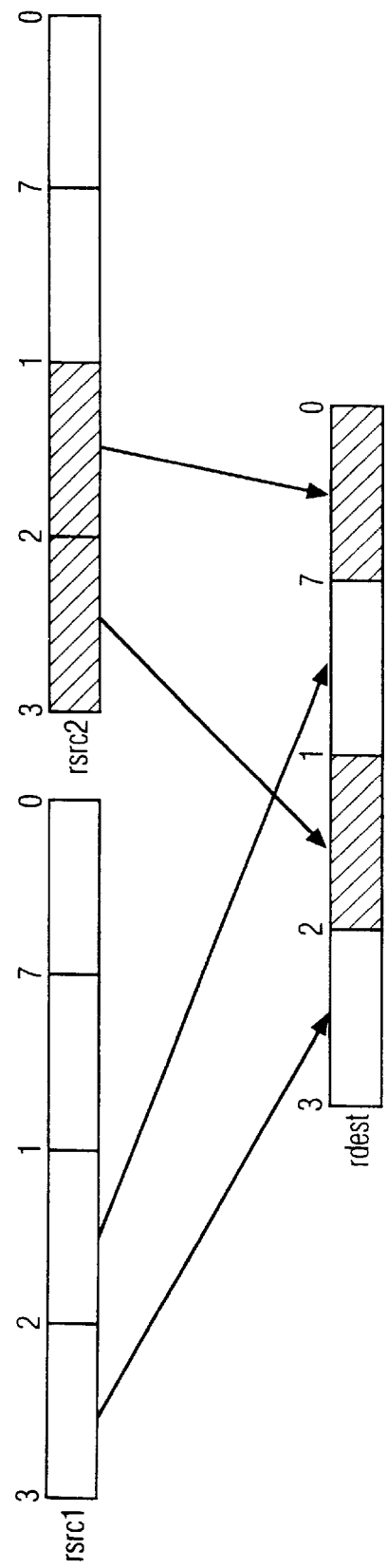
FIG. 10
FIG. 11

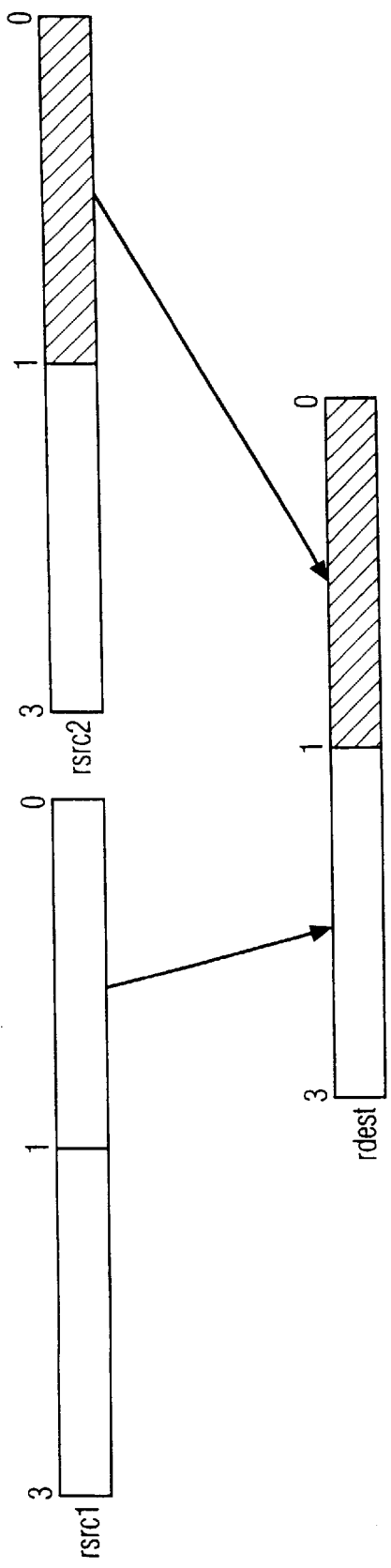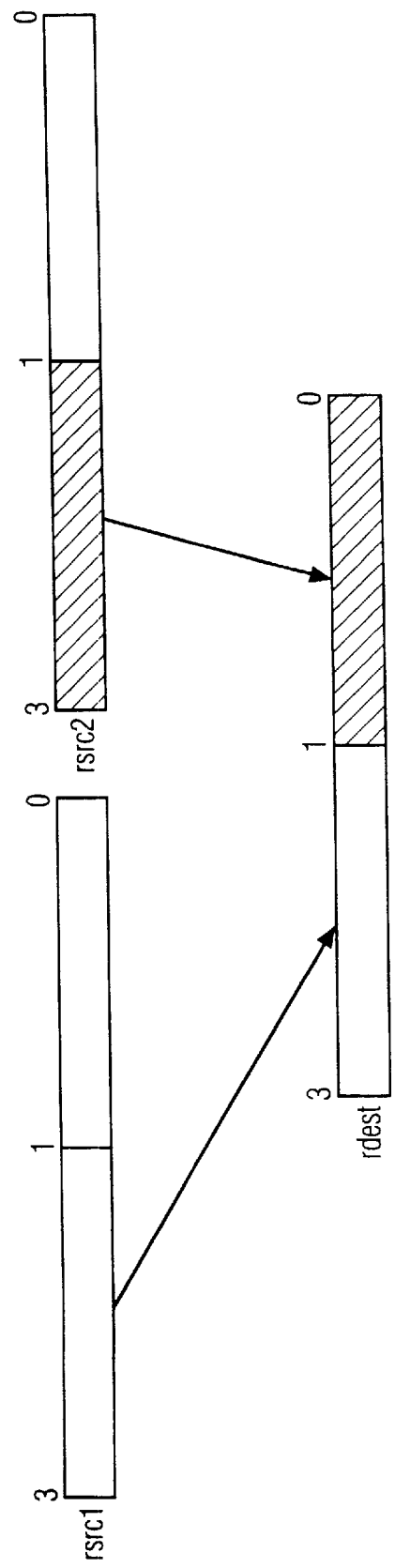

METHOD AND APPARATUS FOR CUSTOM OPERATIONS

CROSS-REFERENCE TO RELATED APPLICATIONS

This application claims the benefit of U.S. Provisional Application 60/003,140 filed Sep. 1, 1995, and U.S. Provisional Application No. 60/004,642 filed Sep. 29, 1995.

The following applications are incorporated by reference herein for discussion of VLIW processing systems:

U.S. Pat. No. 5,103,311: DATA PROCESSING MODULE AND VIDEO PROCESSING SYSTEM INCORPORATING SAME;

U.S. Pat. No. 5,450,556: VLIW PROCESSOR WHICH USES PATH INFORMATION GENERATED BY A BRANCH CONTROL UNIT TO INHIBIT OPERATIONS WHICH ARE NOT ON A CORRECT PATH;

U.S. Pat. No. 5,313,551: MULTIPORT MEMORY BYPASS UNDER SOFTWARE CONTROL;

U.S. application Ser. No. 07/998,080 filed Dec. 29, 1992 entitled VLIW PROCESSOR WITH LESS INSTRUCTION ISSUE SLOTS THAN FUNCTIONAL UNITS, now abandoned in favor of continuation application U.S. Ser. No. 08/445,963 filed May 22, 1995, now abandoned in favor of continuation application U.S. Ser. No. 08/810,003 filed Mar. 3, 1997, now U.S. Pat. No. 6,002,880;

U.S. Ser. No. 07/594,534 filed Oct. 5, 1990 entitled PROCESSING DEVICE INCLUDING A MEMORY CIRCUIT AND A GROUP OF FUNCTIONAL UNITS, now abandoned in favor of continuation application U.S. Ser. No. 08/063,850 filed May 19, 1993, now abandoned in favor of continuation application U.S. Ser. No. 08/425,697 filed Apr. 19, 1995, now U.S. Pat. No. 5,692,139;

U.S. Ser. No. 08/358,127 filed Dec. 16, 1994 entitled EXCEPTION RECOVERY IN A DATA PROCESSING SYSTEM, now U.S. Pat. No. 5,832,202; and Concurrently filed applications PCT/US 96/13900 filed Aug. 30, 1996 entitled METHOD AND APPARATUS FOR CUSTOM OPERATIONS FOR MULTIMEDIA APPLICATIONS USING CLIPPING FUNCTIONS and U.S. Pat. No. 5,963,744, filed Apr. 30, 1997 entitled METHOD AND APPARATUS FOR CUSTOM OPERATIONS USING MULTIPLE OPERANDS FOR PARALLEL PROCESSING UNDER CONTROL OF A SINGLE INSTRUCTION, both having the same inventors as the present application.

Additionally, an updated version of the data book filed in the provisional applications from which this application depends is attached as Appendix A and thus, incorporated.

BACKGROUND OF THE INVENTION

1. Field of the Invention

The present invention is custom operations for use in processor systems which perform functions including multimedia functions, such as, for example, a system with an ability to handle high-quality video and audio and for performing specialized, high-function operations.

2. Description of the Related Art

A system may include a general-purpose CPU and additional units to serve as a multi-function PC enhancement vehicle. Typically, a PC must deal with multi-standard video and audio streams, and users desire both decompression and compression, if possible. While the CPU chips used in PCS are becoming capable of low-resolution real-time video decompression, high-quality video decompression and compression are still not possible. Further, users demand that their systems provide live video and audio without sacrificing responsiveness of the system.

For both general-purpose and embedded microprocessor-based applications, programming in a high-level language is desirable. To effectively support optimizing compilers and a simple programming model, certain microprocessor architecture features are needed, such as a large, linear address space, general-purpose registers, and register-to-register operations that directly support manipulation of linear address pointers. A recently common choice in microprocessor architectures is 32-bit linear addresses, 32-bit registers, and 32-bit integer operations although 64 and 128 bit systems are currently in development.

For data manipulation in many algorithms, however, data operations using the entire number of bits (i.e., 32 bits for a 32-bit system) are wasteful of expensive silicon resources. Important multimedia applications, such as decompression of MPEG video streams, spend significant amounts of execution time dealing with eight-bit data items. Using 32-, 64-, 128-, . . . , bit operations to manipulate small data items makes inefficient use of 32-, 64-, 128-, . . . , bit execution hardware in the implementation. Therefore, custom operations may operate on data items simultaneously and thus, improve performance by a significant factor with only a tiny increase in implementation costs.

Although a similar performance increase through other means may be achieved, e.g., executing a higher number of traditional microprocessor instructions per cycle—these other means are generally prohibitively expensive for low-cost target applications. Additionally, use of m-bit operations, for example 32-bit operations, to manipulate small data items of n-bits where n<m is an inefficient use of m-bit execution hardware in the implementation.

SUMMARY OF THE PRESENT INVENTION

The present invention enhances a system, such as a PC system, to provide real-time multimedia capabilities while maintaining advantages of a special-purpose, embedded solution, i.e. low cost and chip count, and advantages of a general-purpose processor-reprogramability. For PC applications, the present invention surpasses the capabilities of fixed-function multimedia chips.

Accordingly, one object of the present invention is to achieve extremely high multimedia performance at a low price.

A further object of the present invention is to increase processing speed in small kernels of applications.

A still further object of the present invention is to achieve full advantage of cache/memory bandwidth while not requiring an inordinate number of byte-manipulation instructions.

Another object of the present invention is to provide specialized, high-function operations to improve performance in multimedia applications.

A further object of the present invention is to provide custom operations which efficiently use specified bit execution hardware in implementation of operations.

A still further object of the present invention is to provide custom operations which may be, for example, tailored to specific applications such as multimedia applications.

Another object of the present invention is to use multiple operand registers storing multiple operands for parallel processing under control of a single instruction. This is particularly advantageous in video and/or audio applications where samples are currently 8 or 16 bits.

The present invention can be used in low-cost, single-purpose systems such as video phones to reprogrammable, multi-purpose plug-in cards for traditional personal computers. Additionally, the present invention may be used in a system which easily implements popular multimedia standards such as MPEG-1 and MPEG-2. Moreover, orientation of the present invention around a powerful general-purpose CPU makes it capable of implementing a variety of multimedia algorithms, whether open or proprietary.

Defining software compatibility at a source-code level has an advantage of providing freedom to strike an optimum balance between cost and performance. Powerful compilers ensure that programmers never need to resort to non-portable assembler programming. The present invention allows programmers to use powerful low level operations from source code with dsp-like operations being invoked with a familiar function-call syntax.

A computer system includes input registers for receiving data comprising M bits and comprising operand data comprising N bits, N being less than or equal to M; a processor for performing a set of operations on selected operand data of the input data, each operation producing respective result data of N bits; and a destination register for storing the respective result data.

Still other objects and advantages of the present invention will become readily apparent to those skilled in this art from the following detailed description, wherein only the preferred embodiment of the invention is shown and described, simply by way of illustration of the best mode contemplated of carrying out the invention. As will be realized, the invention is capable of other and different embodiments, and its several details are capable of modifications in various obvious respects, all without departing from the invention. Accordingly, the drawings and description are to be regarded as illustrative in nature, and not as restrictive.

BRIEF DESCRIPTION OF THE DRAWINGS

These objects as well as other objects of the present invention will be apparent from the description of the present invention including the aid of the following drawings:

FIG. 3a illustrates an example of an organization of a matrix in memory;

FIG. 3b illustrates a task to be performed;

FIG. 4 illustrates an application for a byte-matrix transposition using custom operations;

FIG. 5(a) and 5(b) illustrate a list of operations to perform the byte-matrix transposition illustrated in FIG. 4;

FIG. 10 illustrates a mergelsb operation;

FIG. 11 illustrates a mergemsb operation;

FIG. 12 illustrates a pack16lsb operation;

FIG. 13 illustrates a pack16msb operation;

DESCRIPTION OF PREFERRED EMBODIMENTS

Figure 1:
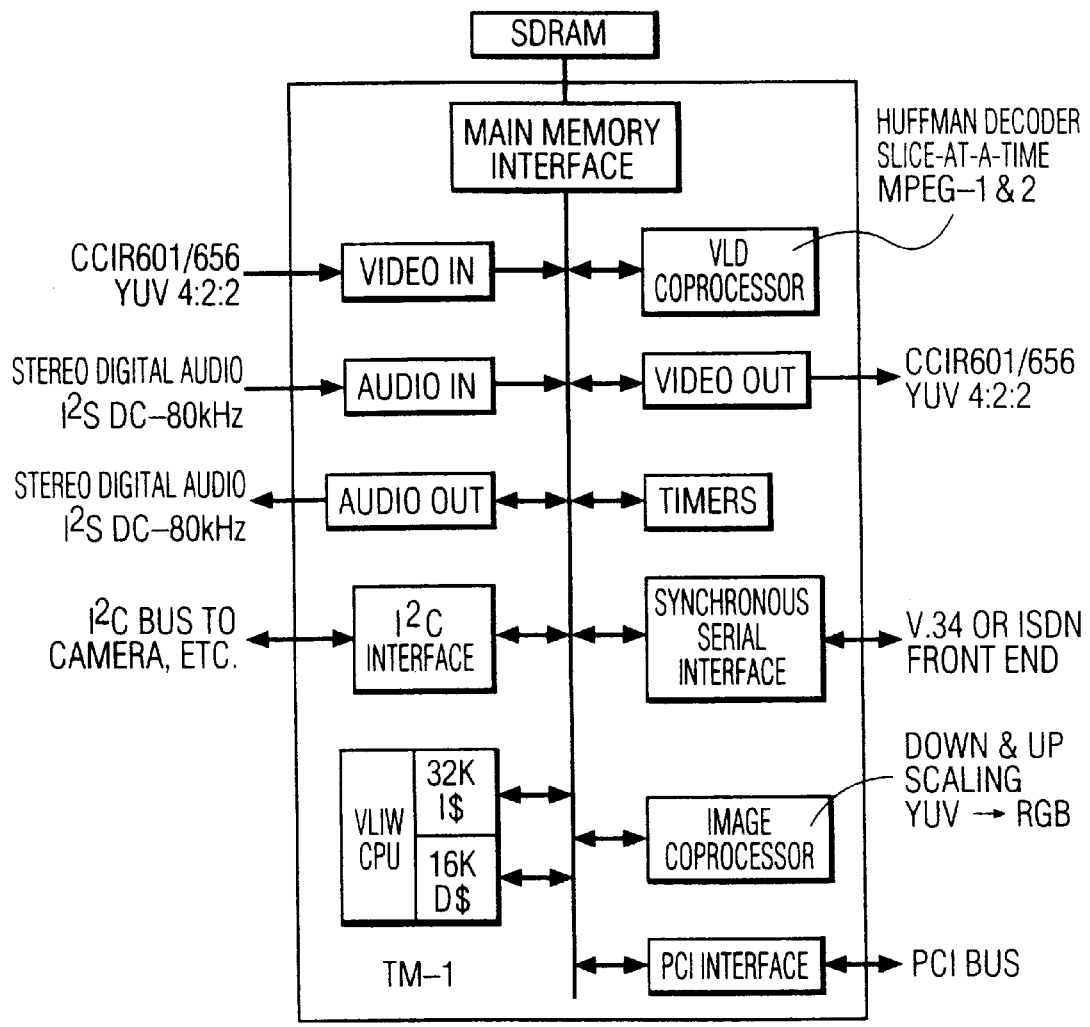
FIG. 1 is a block diagram of an example system for use with the present invention.

FIG. 1 shows a block diagram of an example system for use with the present invention. This system includes a microprocessor, a block of synchronous dynamic RAM (SDRAM), and external circuitry needed to interface to incoming and/or outgoing multimedia data streams.

In this example, a 32-bit CPU forms a VLIW processor core. The CPU implements a 32-bit linear address space and 128 fully general-purpose 32-bit registers. In the present system, the registers are not separated into banks. Instead, any operation can use any register for any operand.

In this system, the CPU uses a VLIW instruction-set architecture allowing up to five simultaneous operations to be issued. These operations can target, in this example, any five of 27 functional units in the CPU, including integer and floating-point arithmetic units and data-parallel dsp-like units.

The operation set of a CPU utilizing the present invention may include traditional microprocessor operations in addition to multimedia-specific operations that dramatically accelerate standard video compression and decompression algorithms. A single special or "custom" operation, one of several operations issued in a single instruction, in this example five operations, can implement up to 11 traditional microprocessor operations. Multimedia-specific operations combined with VLIW, RISC, or other architecture result in tremendous throughput for multimedia applications.

The present invention allows use of one register of 32, 64, 128, . . . , bits for data to perform these "multimedia" operations.

Figure 2:
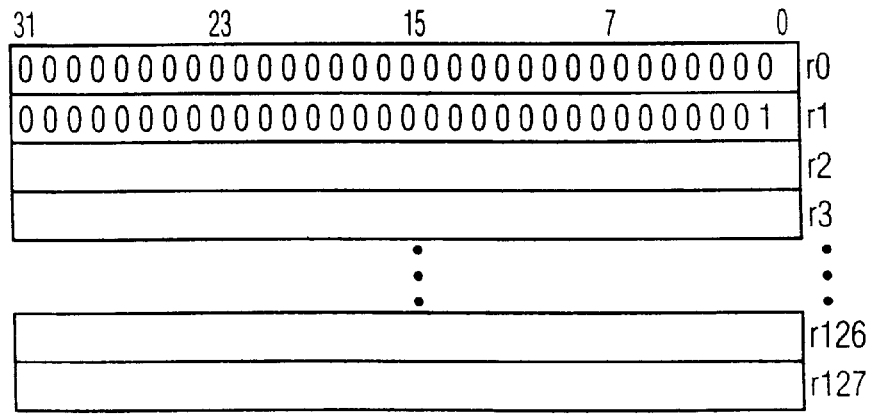
FIG. 2 illustrates an example of CPU register architecture.

FIG. 2 illustrates one example of a CPU register architecture. The CPU of the present embodiment has 128 fully general-purpose 32-bit registers, labeled r0 . . . r127.

In this embodiment, registers r0 and r1 are used for special purposes and registers r2 through r127 are true general purpose registers.

In the present system, the processor issues one long instruction every clock cycle. Each such instruction includes several operations (5 operations for the present embodiment). Each operation is comparable to a RISC machine instruction, except that execution of an operation is conditional upon the content of a general purpose register.

Data in the register may be in, for example, integer representation or floating point representation.

Integer Representation

Integers may be considered, in the present embodiment, as 'unsigned integers' or 'signed integers', as binary and two's complement bit patterns, respectively.

Arithmetic on integers does not generate traps. If a result is not representable, the bit pattern returned is operation specific, as defined in the individual operation description section. The typical cases are: wrap around for regular add and subtract type operations, clamping against the minimum or maximum representable value for DSP-type operations or returning the least significant 32-bit value of a 64-bit result (e.g., integer/unsigned multiply).

Floating Point Representation

Since the present embodiment is 32-bit architecture, it does not use floating point representation for values of data used in the multimedia operations. However, clearly for a 64-bit, 128-bit, . . . , architecture, floating point representation could be used for values of data used in the multimedia operations.

For example, single precision (32-bit) IEEE-754 floating point arithmetic and/or double precision (64-bit) IEEE-754 floating point could be used to represent data values.

Guarding (Conditional Execution)

In the architecture of the present invention, all operations are optionally 'guarded'. A guarded operation executes conditionally, depending on the value in a 'guard' register (rguard). For example, a guarded integer add (iadd) is written as:

IF r23 iadd r14 r10→r13

In this example, "if r23 then r13:=r14+r10". The 'if r23' clause evaluates TRUE or FALSE depending on the LSB of the value in r23. Hence, depending on the LSB of r23, r13 is either unchanged or set to contain an integer sum of r14 and r10. For example, in this embodiment of the present invention, if the LSB is evaluated as 1, a destination register (rdest, in this example r13, is written.

Guarding controls effects on programmer visible states of the system, i.e. register values, memory content and device state.

Load and Store Operations

Memory in the present invention is byte addressable. Loads and stores are 'naturally aligned', i.e. a 16-bit load or store targets an address that is a multiple of 2. A 32-bit load or store targets an address that is a multiple of 4.

One skilled in the art could easily modify this.

Compute Operations

Compute operations are register-to-register operations. A specified operation is performed on one or two source registers and a result is written to a destination register (rdest).

Custom Operations

Custom operations are special compute operations and are like normal compute operations; however, these custom operations are not found in general purpose CPUs. The custom operations advantageously allow performance of operations for, for example, multimedia applications. The custom operations of the present invention are specialized, high-function operations designed to dramatically improve performance in important multimedia applications as well as in other applications. When properly incorporated into application source code, custom operations enable an application to take advantage of a highly parallel microprocessor implementation such as a Trimedia TM-1 chip manufactured by Philips Electronics, of the present invention.

For both general-purpose and embedded microprocessor-based applications, programming in a high-level language may be desirable. To effectively support optimizing compilers and a simple programming model, certain microprocessor architecture features are needed, such as a large, linear address space, general-purpose registers, and register-to-register operations that directly support manipulation of linear address pointers.

The present invention allows use of the system's entire resources, such as, for example, 32-bit resources, to operate on two sixteen-bit data items or four eight-bit data items simultaneously. This use improves performance by a significant factor with only a tiny increase in implementation cost. Additionally, this use achieves a high execution rate from standard microprocessor resources.

Some high-function custom operations eliminate conditional branches, which helps a scheduler effectively use five operation slots in each instruction of the present system, for example, the Philips TM-1 chip with TM-1 instructions. Filling up all five slots is especially important in inner loops of computationally intensive multimedia applications. Custom operations help the present invention achieve extremely high multimedia performance at the lowest possible cost.

Table 1 is a listing of custom operations of the present invention. Some custom operations exist in several versions that differ in treatment of respective operands and results. Mnemonics for these different versions attempt to clarify the respective treatment to aid in selection of the appropriate operation, although clearly, different mnemonics or names could be assigned.

TABLE 1

Custom operations listed by function type

| Function | Custom Pop | Description |
| --- | --- | --- |
| DSP absolute value | dspidualabs | Dual clipped absolute values of signed 16-bit halfwords |
| DSP add | dspidualadd | Dual clipped add of signed 16-bit halfwords |
|  | dspuquadaddui | Quad clipped add of unsigned/signed bytes |
| DSP multiply | dspidualmul | Dual clipped multiply of signed 16-bit halfwords |
| DSP subtract | dspidualsub | Dual clipped subtract of signed 16-bit halfwords |
| Merge, pack | mergelsb | Merge least-significant bytes |
|  | mergemsb | Merge most-significant bytes |
|  | pack16lsb | Pack least-significant 16-bit halfwords |
|  | pack16msb | Pack most-significant 16-bit halfwords |
|  | packbytes | Pack least-significant bytes |
| Byte averages | quadavg | Unsigned byte-wise quad average |
| Byte multiples | quadumulmsb | Unsigned quad 8-bit multiply most significant |

An example is presented to illustrate use of a custom operation of the present invention. This example, a byte-matrix transposition, provides a simple illustration of how custom operations can significantly increase processing speed in small kernels of applications. As in most uses of custom operations, the power of custom operations in this case comes from their ability to operate on multiple data items in parallel.

For example, a task to transpose a packed, four-by-four matrix of bytes in memory. The matrix might, for example, contain eight-bit pixel values. FIG. 3(a) illustrates both organization of the matrix in memory and, FIG. 3(b) illustrates in standard mathematical notation, the task to be performed.

Performing this operation with traditional microprocessor instructions is straight forward but time consuming. One method to perform the manipulation is to perform 12 load-byte instructions to load bytes (since only 12 of the 16 bytes need to be repositioned) and 12 store-byte instructions to store the bytes back in memory in their new positions. Another method would be to perform four load-word instructions, reposition bytes of the loaded words in registers, and then perform four store-word instructions. Unfortunately, repositioning the bytes in registers requires a large number of instructions to properly shift and mask the bytes. Performing twenty four loads and stores makes implicit use of shifting and masking hardware in load/store units and thus yields a shorter instruction sequence.

The problem with performing twenty four loads and stores is that loads and stores are inherently slow operations: they must access at least cache and possibly slower layers in a memory hierarchy. Further, performing byte loads and stores when 32-bit word-wide accesses run as fast wastes the power of the cache/memory interface. A fast algorithm that takes full advantage of cache/memory bandwidth while not requiring an inordinate number of byte-manipulation instructions is desired.

The present invention has instructions that merge (mergemsb and mergelsb) and pack bytes and 16-bit halfwords (pack 16 msb and pack16lsb) directly and in parallel. Four of these instructions can be applied for the present example to speed up manipulation of bytes packed into words.

FIG. 4 illustrates application of these instructions to the byte-matrix transposition example. FIG. 5(a) shows a list of the operations needed to implement a matrix transpose. When assembled into actual instructions, these custom operations would be packed as tightly as dependencies allow, for example, up to five operations per instruction. Low-level code in FIG. 5(a) is shown here for illustration purposes only.

A first sequence of four load-word operations (ld32d) in FIG. 5(a) brings the packed words of the input matrix into registers r10, r11, r12, and r13. A next sequence of four merge operations (mergemsb and mergelsb) produces intermediate results in registers r14, r15, r16, and r17. A next sequence of four pack operations (pack16msb and pack16lsb) may then replace the original operands or place the transposed matrix in separate registers if the original matrix operands were needed for further computations (a TM-1 optimizing C compiler could perform such an analysis automatically). In this example, the transpose matrix is placed in separate registers (st32d), registers r18, r19, r20, and r21. Four final four store-word operations put the transposed matrix back into memory.

Thus, using the custom operations of the present invention, the byte-matrix transposition requires four-word operations and four store-word operations (the minimum possible) and eight register-to-register data manipulation operations. The result is 16 operations, or byte-matrix transposition at a rate of one operation per byte. FIG. 5(b) illustrates an equivalent C-language fragment.

While the advantage of the custom-operation-based code over brute-force code that uses 24 load-and store-byte instruction seems to be only eight operations (a 33% reduction) for the present example, the advantage is actually much greater. First, using custom operations, the number of memory references is reduced from twenty four to eight i.e., a reduction by a factor of three. Since memory references are slower than register-to-register operations (such as performed using the custom operations in this example), the reduction in memory references is significant.

Further, the ability of the compiling system of the present system (TM-1 system) to exploit performance potential of the TM-1 microprocessor hardware is enhanced by the custom-operation-based code.

Specifically, the compiling system more easily produces an optimal schedule (arrangement) of the code when the number of memory references is in balance with the number of register-to-register operations. Generally high-performance microprocessors have a limit on the number of memory references that can be processed in a single cycle. As a result, a long sequence of code that contains only memory references can cause empty operation slots in the long TM-1 instructions and thus, waste performance potential of the hardware.

As this example has shown, use of the custom operations of the present invention may reduce the absolute number of operations needed to perform a computation and can also help a compiling system produce code that fully exploits the performance potential of the respective CPU.

Other applications such as MPEG image reconstruction for, for example, a complete MPEG video decoding algorithm and motion-estimation kernels could be benefited by use of the custom operations of the present invention.

The present invention includes those custom operations listed in Table 1. The specifics of each of these custom operations are set forth below. In the function code given below, standard notation is used. For example, temp1 and temp2 represent temporary registers. Further, as an example, a function temp1←sign_ext16to32(rsrc1<15:0>) means that temp1 is loaded with the 15:0 bits (bits 0 to 15) of the rsrc1 register with the sign bit (in this example, the 15th bit) being extended to the 16 to 32 bits (sign bit extension). Similarly, temp2←sign_ext16to32(rsrc1<16:31>) indicates that the 16th to 31st bits of rsrc1 are extracted (and for operation purposes, 'placed' in the 0 to 15th bits) and the sign bit which, in this example, is the 31st bit, is sign extended to the 16th to 32nd bits. This sign extension is used for signed values, in this example, signed integers. For unsigned values, zero fill is used. The notation for zero fill is very similar to that of sign extend. For example, zero_ext8to32(rsrc1<15:0>) indicates that the value of the 15 to 0 bits are to be extracted and the 8th to 32nd bits are filled with zeros. rsrc1, rsrc2 and rdest may be any of the available registers as discussed above.

dspidualabs dspidualabs is a dual clipped absolute value of signed 16-bit halfwords operation, pseudo operation for h_dspidualabs (hardware dspidualabs). This operation has the following function:

```
if rguard then {
    temp1 ← sign_ext16to32 (rsrc1<15:0>)
    temp2 ← sign_ext16to32 (rsrc1<31:16>)
    if temp1 = 0xffff8000 then temp1 ← 0x7fff
    if temp2 = 0xffff8000 then temp2 ← 0x7fff
    if temp1 < 0 then temp1 ← −temp1
    if temp2 < 0 then temp2 ← −temp2
    rdest<31:16> ← temp2<15:0>
    rdest<15:0> ← temp1<15:0>
}
```

The dspidualabs operation is a pseudo operation transformed by the scheduler into an h_dspidualabs with, in this example, a constant zero as a first argument and the dspidualabs argument as a second argument.

The dspidualabs operation performs two 16-bit clipped, signed absolute value computations separately on the high and low 16-bit halfwords of rsrc1. Both absolute values are clipped into a range [0x0 . . . 0x7fff] and written into corresponding halfwords of rdest. All values are signed 16-bit integers.

The dspidualabs operation optionally takes a guard, specified in rguard. If a guard is present, in this example its LSB controls modification of the destination register (rdest). If the LSB of rguard is 1, in this example, rdest is written; otherwise, rdest is not changed.

dspidualadd dspidualadd is a dual clipped add of signed 16-bit halfwords operation. This operation has the following function:

```
if rguard then {
    temp1 ← sign_ext16to32 (rsrc1<15:0>) +
        sign_ext16to32 (rsrc2<15:0>)
    temp2 ← sign_ext16to32(rsrc1<31:16>) +
        sign_ext16to32 (rsrc2<31:16>)
    if temp1 < 0xffff8000 then temp1 ← 0x8000
    if temp2 = 0xffff8000 then temp2 ← 0x8000
    if temp1 > 0x7fff then temp1 ← 0x7fff
```

-continued

```
        if temp2 < 0x7fff then temp2 ← 0x7fff
        rdest<31:16> ← temp2<15:0>
        rdest<15:0> ← temp1<15:0>
}
```

Figure 6:
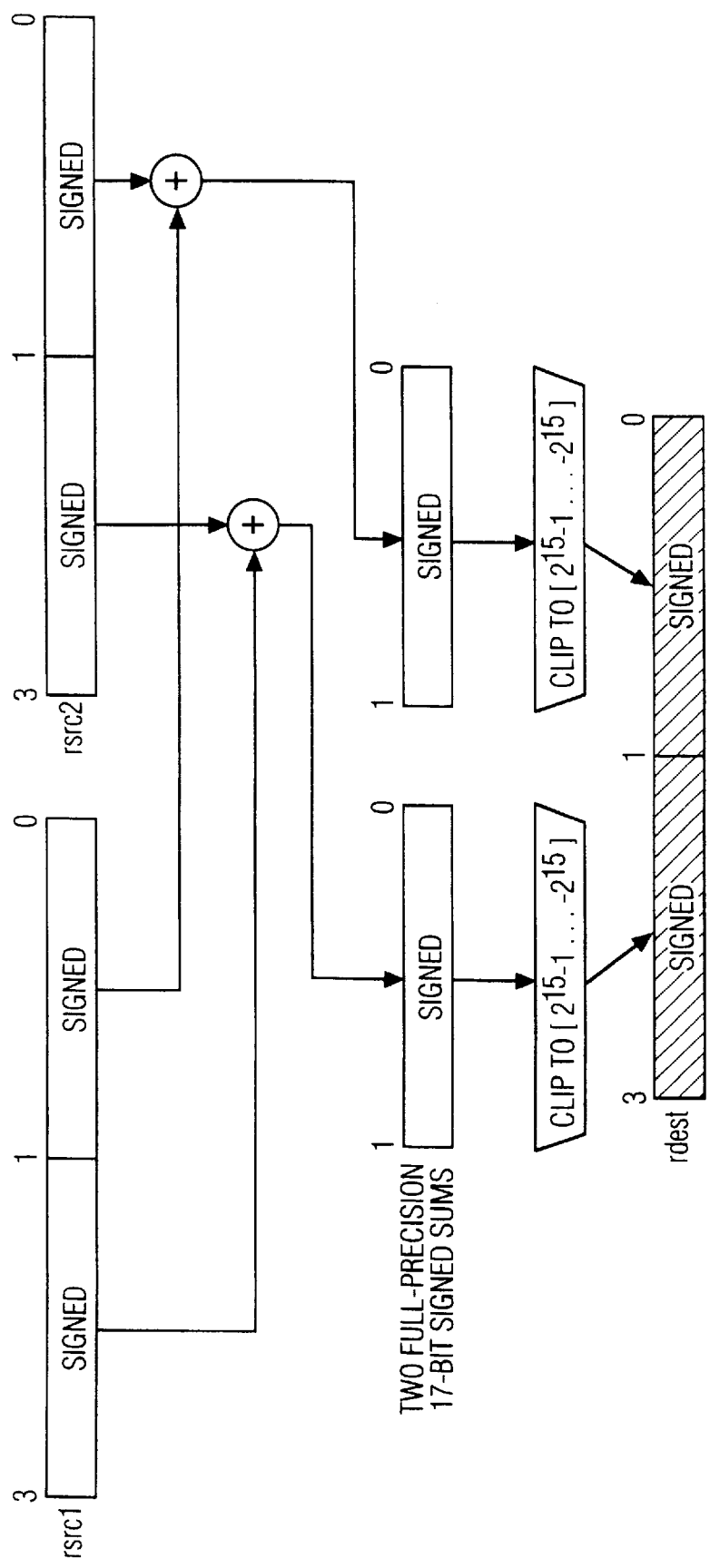
FIG. 6 illustrates a dspidualadd operation.

As shown in FIG. 6, the dspidualadd operation computes two 16-bit clipped, signed sums separately on two respective pairs of high and low 16-bit halfwords of rsrc1 and rsrc2. Both sums are clipped into a range $[2^{15}-1 \ldots 2^{15}]$ or [0x7fff . . . 0x8000] and written into corresponding halfwords of rdest. All values are signed 16-bit integers.

The dspidualadd operation optionally takes a guard, specified in rguard. If a guard is present, in this example its LSB controls modification of the destination register. If the LSB of rguard is 1, in this example, rdest is written; otherwise, rdest is not changed.

dspuaquadaddui dspuquadaddui is a quad clipped add of unsigned/signed bytes operation. This operation has the following function:

```
        if rguard then {
            for (I←0,m←31,n←24;i<4;i←I+1,m←m−8,n←n−8) {
                temp ← zero_ext8to32(rsrc1<m:n>)
                    +sign_ext8to32 (rsrc2<m:n>)
                if temp < 0 then
                    rdest<m:n> ← 0
                else if temp > 0xff then
                    rdest<m:n> ← 0xff
                else rdest<m:n> ← temp<7:0>
            }
        }
```

Figure 7:
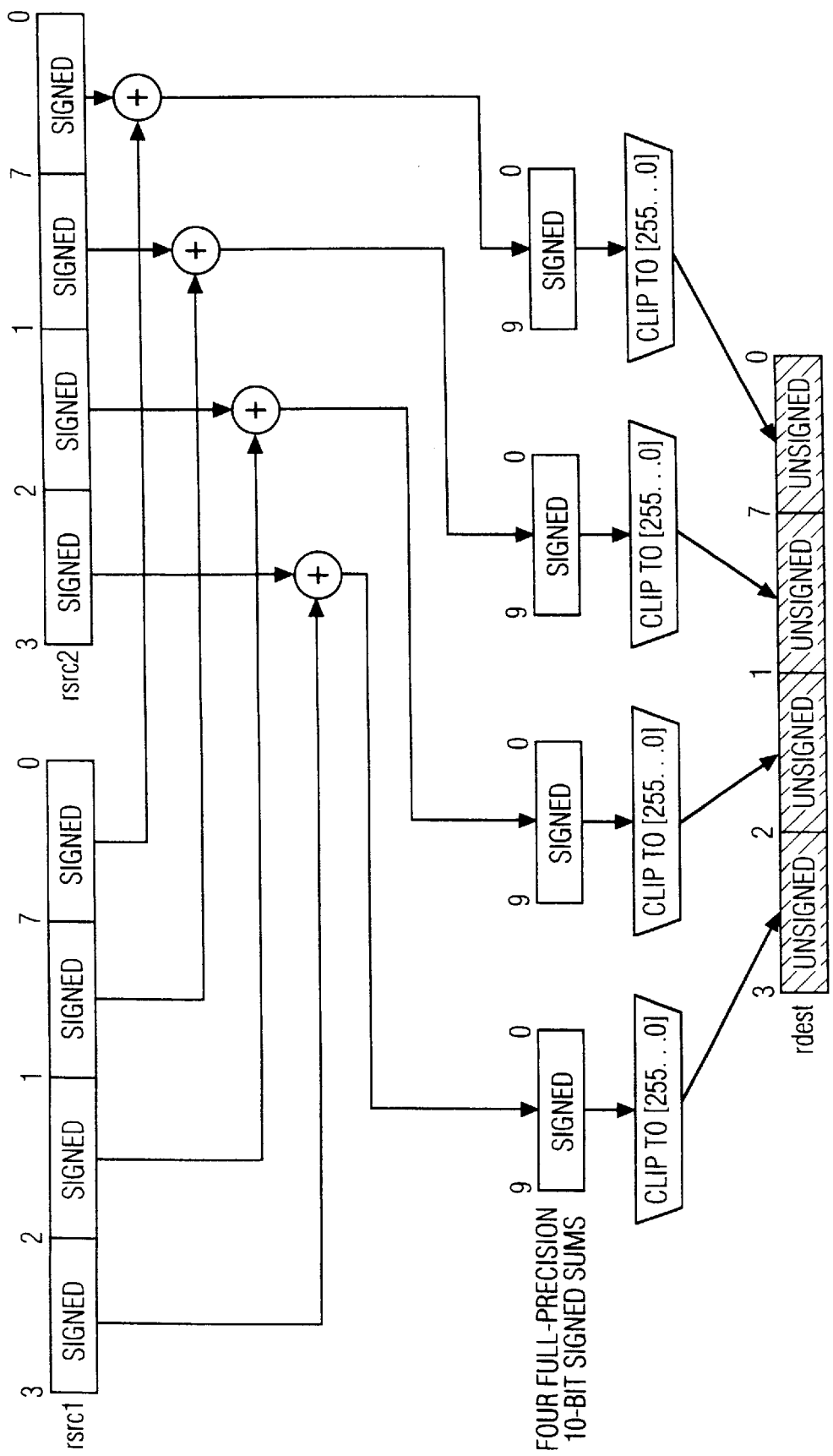
FIG. 7 illustrates a dspuquadaddui operation.

As shown in FIG. 7, the dspuquadaddui operation computes four separate sums of four respective pairs of corresponding 8-bit bytes of rsrc1 and rsrc2. Bytes in rsrc1 are considered unsigned values; bytes in rsrc2 are considered signed values. The four sums are clipped into an unsigned range [255 . . . 0] or [0xff . . . 0]; thus, resulting byte sums are unsigned. All computations are performed without loss of precision.

The dspuquadaddui operation optionally takes a guard, specified in rguard. If a guard is present, in this example its LSB controls modification of the destination register. If the LSB of rguard is 1, in this example, rdest is written; otherwise, rdest is not changed.

dspidualmul dspidualmul is a dual clipped multiply of signed 16-bit halfwords operation. This operation has the following function:

```
        if rguard then {
            temp1 ← sign_ext16to32 (rsrc1<15:0>) x
        sign_ext16to32 (rsrc2<15:0>)
            temp2 ← sign_ext16to32 (rsrc1<31:16>) x
        sign_ext16 to 32 (rsrc2<31:16>)
                if temp1 < 0xffff8000 then temp1 ← 0x8000
                if temp2 = 0xffff8000 then temp2 ← 0x8000
                if temp1 > 0x7fff then temp1 ← 0x7fff
                if temp2 < 0x7fff then temp2 ← 0x7fff
                rdest<31:16> ← temp2<15:0>
                rdest<15:0> ← temp1<15:0>
        }
```

Figure 8:
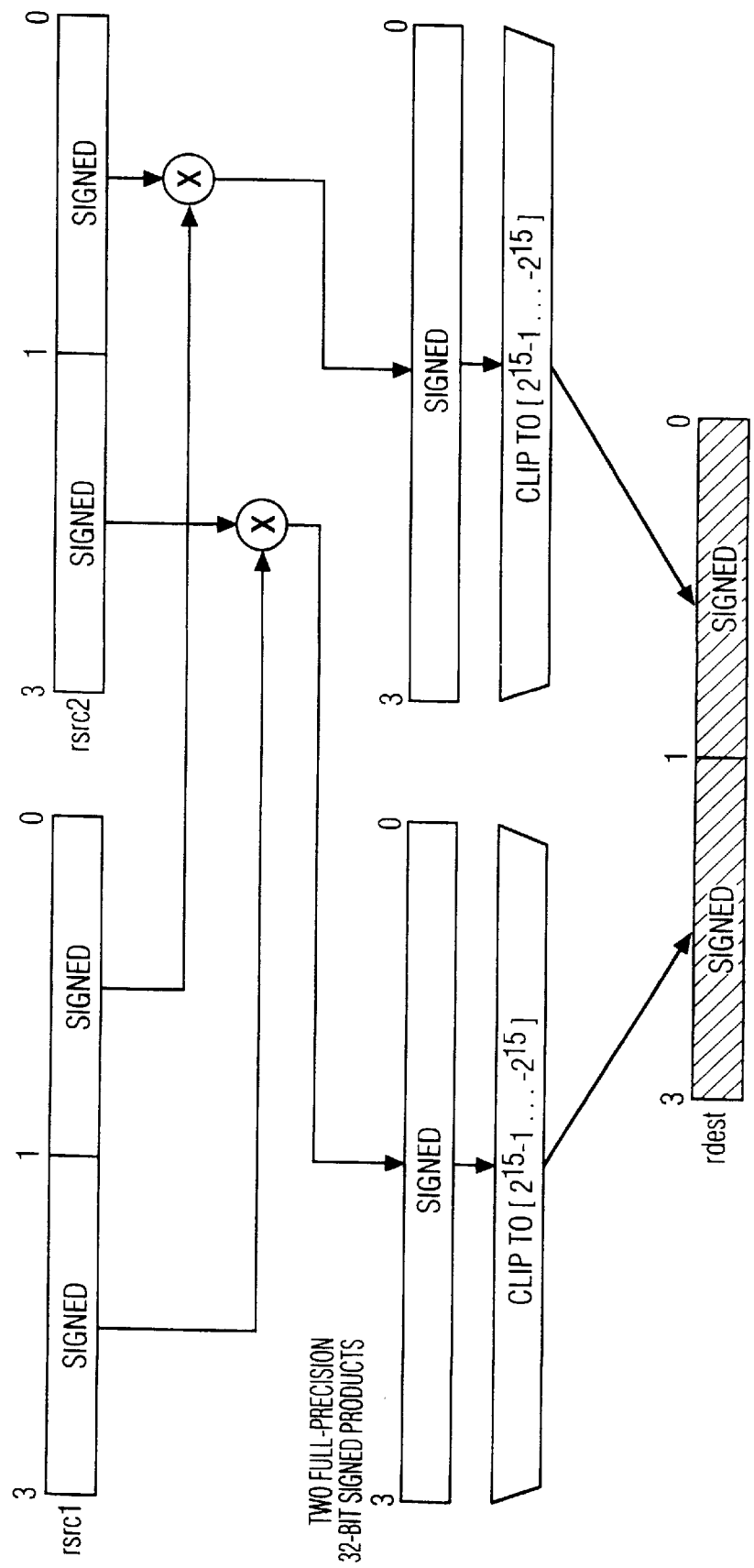
FIG. 8 illustrates a dspidualmul operation.

As shown in FIG. 8, the dspidualmul operation computes two 16-bit clipped, signed products separately on two respective pairs of high and low 16-bit halfwords of rsrc1 and rsrc2. Both products are clipped into a range $[2^{15}-1 \ldots -2^{15}]$ or [0x7fff . . . 0x8000] and written into corresponding halfwords of rdest. All values are signed 16-bit integers.

The dspidualmul operation optionally takes a guard, specified in rguard. If a guard is present, in this example its LSB controls modification of the destination register. If the LSB of rguard is 1, in this example, rdest is written; otherwise, rdest is not changed.

dspidualsub dspidualsub is a dual clipped subtract of signed 16-bit halfwords operation. This operation has the following function:

```
        if rguard then {
                temp1 ← sign_ext16to32 (rsrc1<15:0>) -
        sign_ext16to32 (rsrc2<15:0>)
                temp2 ← sign_ext16to32 (rsrc1<31:16>) -
        sign_ext16to32 (rsrc2<31:16>)
                if temp1 < 0xffff8000 then temp1 ← 0x8000
                if temp2 < 0xffff8000 then temp2 ← 0x8000
                if temp1 > 0x7fff then temp1 ← 0x7fff
                if temp2 > 0x7fff then temp2 ← 0x7fff
                rdest<31:16> ← temp2<15:0>
                rdest<15:0> ← temp1<15:0
        }
```

Figure 9:
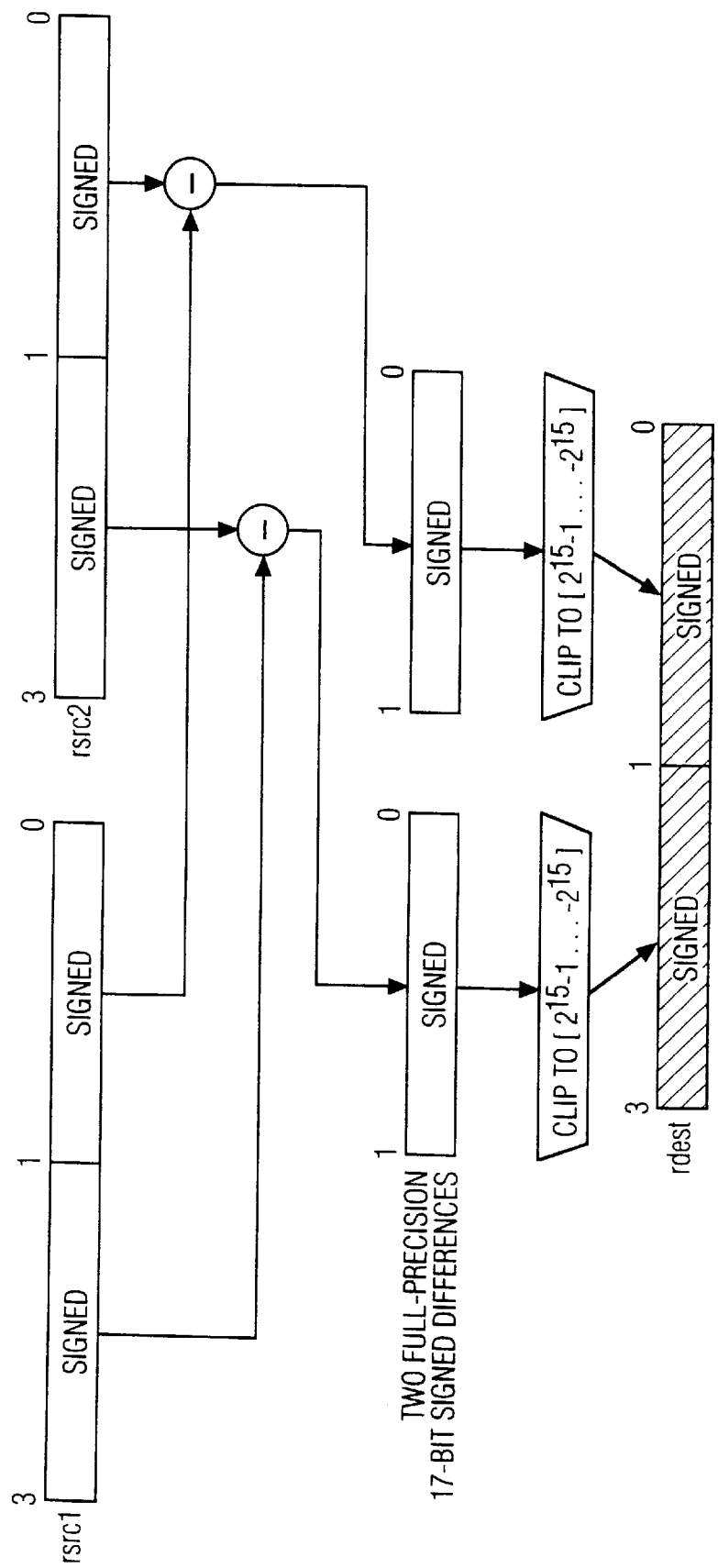
FIG. 9 illustrates a dspidualsub operation.

As shown in FIG. 9, the dspidualsub operation computes two 16-bit clipped, signed differences separately on two respective pairs of high and low 16-bit halfwords of rsrc1 and rsrc2. Both differences are clipped into a range $[2^{15}-1 , , , -2^{15}]$ or [0x7fff . . . 0x8000] and written into corresponding halfwords of rdest. All values are signed 16-bit integers.

The dspidualsub operation optionally takes a guard, specified in rguard. If a guard is present, in this example its LSB controls modification of the destination register. If the LSB of rguard is 1, in this example, rdest is written; otherwise, rdest is not changed.

mergelsb mergelsb is a merge least-significant byte operation. This operation has the following function:

```
        if rguard then {
                rdest<7:0>   ← rsrc2<7:0>
                rdest<15:8>  ← rsrc1<7:0>
                rdest<23:16> ← rsrc2<15:8>
                rdest<31:24> ← rsrc1<15:8>
        }
```

As shown in FIG. 10, the mergelsb operation interleaves two respective pairs of least-significant bytes from arguments rsrc1 and rsrc2 into rdest. The least-significant byte from rsrc2 is packed into the least-significant byte of rdest; the least significant byte from rsrc1 is packed into the second-least-significant byte or rdest; the second-least-significant byte from rsrc2 is packed into the second-most-significant byte of rdest; and the second-least-significant byte from rsrc1 is packed into the most-significant byte of rdest.

The mergelsb operation optionally takes a guard, specified in rguard. If a guard is present, in this example its LSB controls modification of the destination register. If the LSB of rguard is 1, in this example, rdest is written; otherwise, rdest is not changed.

mergemsb mergemsb is a merge most-significant byte operation. This operation has the following function:

```
if rguard then {
    rdest<7:0>   ← rsrc2<23:15>
    rdest<15:8>  ← rsrc1<23:15>
    rdest<23:16> ← rsrc2<31:24>
    rdest<31:24> ← rsrc1<31:24>
}
```

As shown in FIG. 11, the mergemsb operation interleaves the two respective pairs of most-significant bytes from arguments rsrc1 and rsrc2 into rdest. The second-most-significant byte from rsrc2 is packed into the least-significant byte of rdest; the second-most-significant byte from rsrc1 is packed into the second-least-significant byte or rdest, the most-significant byte from rsrc2 is packed into the second-most-significant byte of rdest; and the most-significant byte from rsrc1 is packed into the most-significant byte of rdest.

The mergemsb operation optionally takes a guard, specified in rguard. If a guard is present, in this example its LSB controls modification of the destination register. If the LSB of rguard is 1, in this example, rdest is written; otherwise, rdest is not changed.

pack16lsb pack16lsb is a pack least-significant 16-bit halfwords operation. This operation has the following function:

```
if rguard then {
    rdest<15:0>  ← rsrc2<15:0>
    rdest<31:16> ← rsrc1<15:0>
}
```

As shown in FIG. 12, the pack16lsb operation packs two respective least-significant halfwords from arguments rsrc1 and rsrc2 into rdest. The halfword from rsrc1 is packed into the most-significant halfword of rdest and the halfword from rsrc2 is packed into the least-significant halfword or rdest.

The pack16lsb operation optionally takes a guard, specified in rguard. If a guard is present, in this example its LSB controls modification of the destination register. If the LSB of rguard is 1, in this example, rdest is written; otherwise, rdest is not changed.

pack16msb pack16msb is a pack most-significant 16 bits operation. This operation has the following function:

```
if rguard then {
    rdest<15:0>  ← rsrc2<31:16>
    rdest<31:16> ← rsrc1<31:16>
}
```

As shown in FIG. 13, the pack16msb operation packs two respective most-significant halfwords from arguments rsrc1 and rsrc2 into rdest. The halfword from rsrc1 is packed into the most-significant halfword of rdest and the halfword from rsrc2 is packed into the least-significant halfword or rdest.

The pack16msb operation optionally takes a guard, specified in rguard. If a guard is present, in this example its LSB controls modification of the destination register. If the LSB of rguard is 1, in this example, rdest is written; otherwise, rdest is not changed.

packbytes packbytes is a pack least-significant byte operation. This operation has the following function:

```
if rguard then {
    rdest<7:0>  ← rsrc2<7:0>
    rdest<15:8> ← rsrc1<7:0>
}
```

Figure 14:
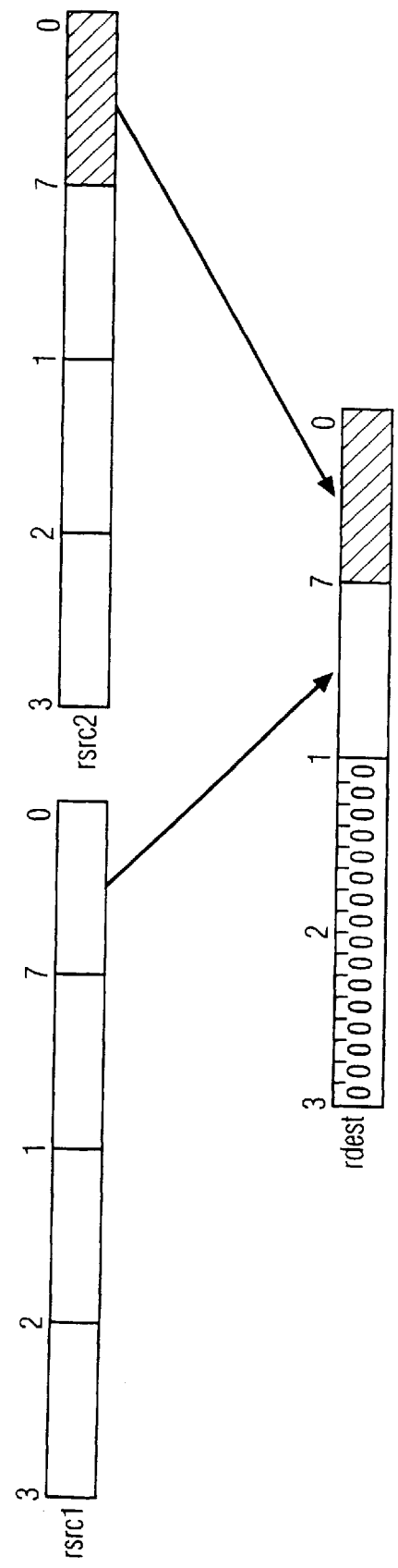
FIG. 14 illustrates a packbytes operation.

As shown in FIG. 14, the packbytes operation packs two respective least-significant bytes from arguments rsrc1 and rsrc2 into rdest. The byte from rsrc1 is packed into the second-least-significant byte of rdest and the byte from rsrc2 is packed into the least-significant byte or rdest. The two most-significant bytes of rdest are filled with zeros.

The packbytes operation optionally takes a guard, specified in rguard. If a guard is present, in this example, its LSB controls modification of the destination register. If the LSB of rguard is 1, in this example, rdest is written.

quadavg quadavg is a unsigned byte-wise quad average operation. This operation has the following function:

```
if rguard then {
    temp ← (zero_ext8to32 (rsrc1<7:0>) +
        zero_ext8to32 (rsrc2<7:0>) + 1)/2
    rdest<7:0>←temp<7:0>
    temp ← (zero_ext8to32 (rsrc1<15:8>) +
        zero_ext8to32 (rsrc2<15:8>) + 1)/2
    rdest<15:8>←temp<7:0>
    temp ← (zero_ext8to32 (rsrc1<23:16>) +
        zero_ext8to32 (rsrc2<23:16>) + 1)/2
    rdest<23:16>←temp<7:0>
    temp ← (zero_ext8to32 (rsrc1<31:24>) +
        zero_ext8to32 (rsrc2<31:24>) + 1)/2
    rdest<31:24>←temp<7:0>
}
```

Figure 15:
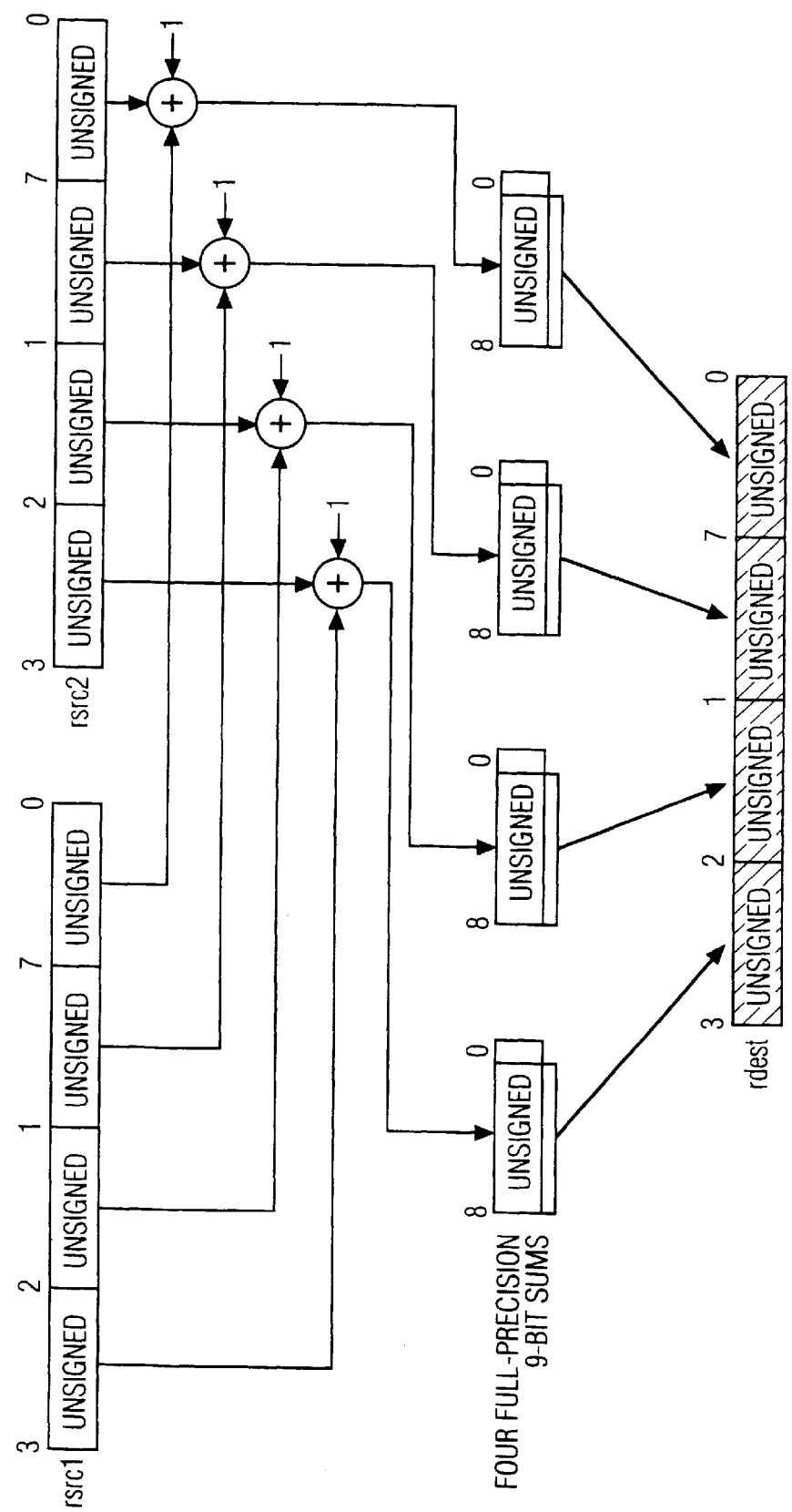
FIG. 15 illustrates a quadavg operation.

As shown in FIG. 15, the quadavg operation computes four separate averages of four respective pairs of corresponding 8-bit bytes of rsrc1 and rsrc2. All bytes are considered unsigned. The least-significant 8 bits of each average is written to the corresponding byte in rdest. No overflow or underflow detection is performed.

The quadavg operation optionally takes a guard, specified in rguard. If a guard is present, in this example its LSB controls modification of the destination register. If the LSB of rguard is 1, in this example, rdest is written; otherwise, rdest is not changed.

quadumulmsb quadumulmsb is a unsigned quad 8-bit multiply most significant operation. This operation has the following function:

```
if rguard then {
    temp ← (zero_ext8to32 (rsrc1<7:0>) x
        zero_ext8to32 (rsrc2<7:0>))
    rdest<7:0>←temp<15:8>
    temp ← (zero_ext8to32 (rsrc1<15:8>) x
        zero_ext8to32 (rsrc2<15:8>))
    rdest<15:8>←temp<15:8>
    temp ← (zero_ext8to32 (rsrc1<23:16>) x
        zero_ext8to32 (rsrc2<23:16>))
    rdest<23:16>←temp<15:8>
    temp ← (zero_ext8to32 (rsrc1<31:24>) x
        zero_ext8to32 (rsrc2<31:24>))
    rdest<31:24>←temp<15:8>
}
```

Figure 16:
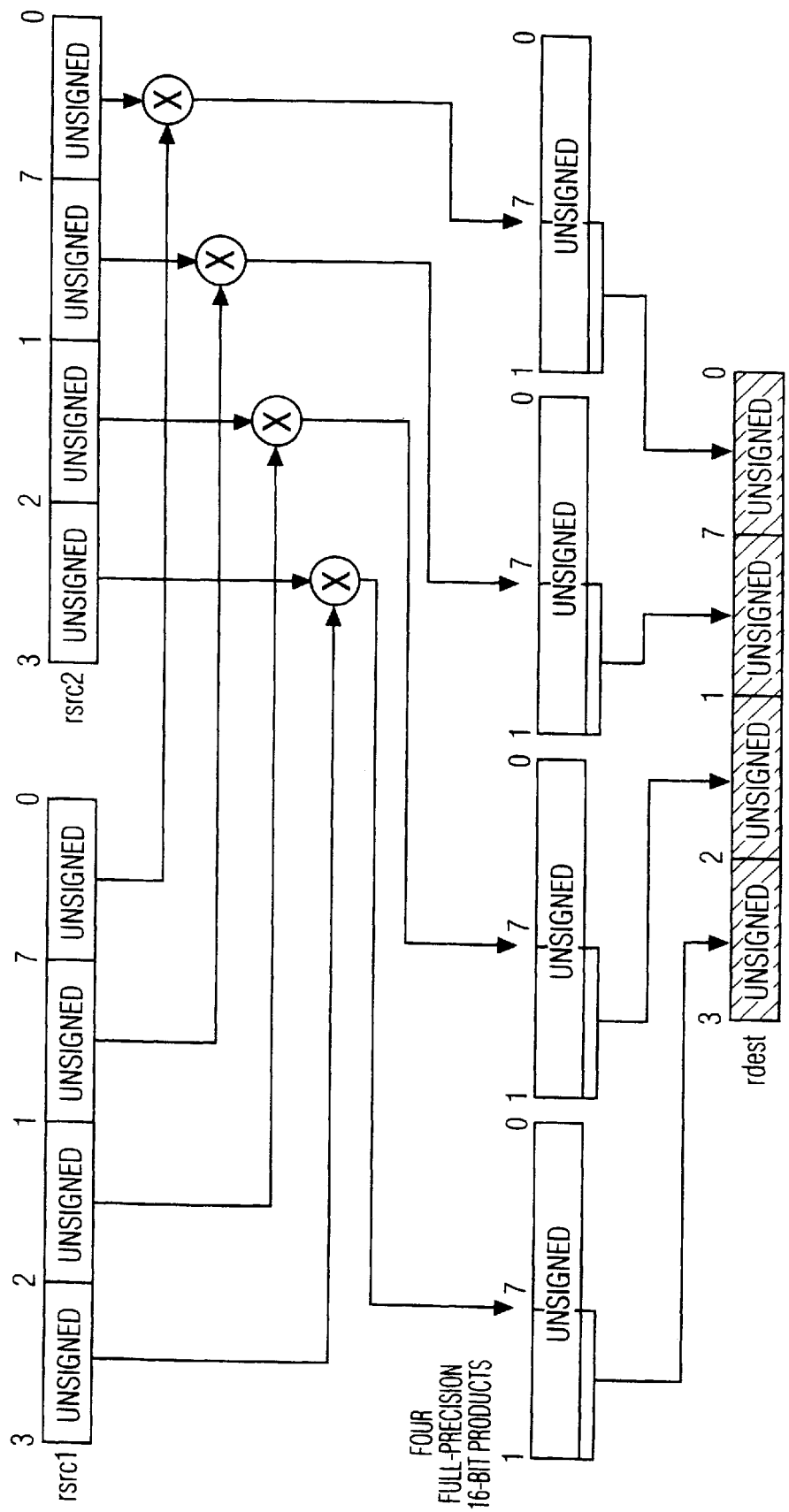
FIG. 16 illustrates a quadumulmsb operation.

As shown in FIG. 16, the quadumulmsb operation computes four separate products of four respective pairs of corresponding 8-bit bytes of rsrc1 and rsrc2. All bytes are considered unsigned. The most-significant 8 bits of each 16-bit product is written to the corresponding byte in rdest.

The quadumulmsb operation optionally takes a guard, specified in rguard. If a guard is present, in this example its LSB controls modification of the destination register. If the LSB of rguard is 1, in this example, rdest is written; otherwise, rdest is not changed.

An additional custom operation which may be used is h_dspidualabs.

h_dspidualabs h_dspidualabs is a hardware dual clipped absolute value of signed 16-bit halfwords operation. This operation has the following function:

```
if rguard then {
    temp1 ← sign_ext16to32 (rsrc2<15:0>)
    temp2 ← sign_ext16to32 (rsrc2<31:16>)
    if temp1 = 0xffff8000 then temp1 ← 0x7fff
    if temp2 = 0xffff8000 then temp2 ← 0x7fff
    if temp1 < 0 then temp1 ← −temp1
    if temp2 < 0 then temp2 ← −temp2
    rdest<31:16> ← temp2<15:0>
    rdest<15:0> ← temp1<15:O>
}
```

The h_dspidualabs operation performs two 16-bit clipped, signed absolute value computations separately on the high and low 16-bit halfwords of rsrc2. Both absolute values are clipped into a range [0x0 . . . 0x7fff] and written into corresponding halfwords of rdest. All values are signed 16-bit integers. This operation requires a zero as first argument. The dspidualabs pseudo operation may be used alternatively.

The h_dspidualabs operation optionally takes a guard, specified in rguard. If a guard is present, in this example its LSB controls modification of the destination register. If the LSB of rguard is 1, in this example, rdest is written; otherwise, rdest is not changed.

By use of the above custom multimedia operations, an application can take advantage of highly parallel microprocessor implementations of multimedia functions with law cost.

From the above disclosure, one may clearly understand that the present invention may be used with many highly parallel microprocessor implementations using VLIW, RISC, super scalar, etc. instruction formats. Additionally, one skilled in the art may easily add additional operations based on the above concepts. For example, a quad clipped subtract of bytes is not specifically described; however, clearly one skilled in the art could easily develop this operation based on the above disclosure.

There accordingly has been described a system and method for custom operations for use in performing multimedia functions.

In this disclosure, there is shown and described only the preferred embodiment of the invention, but, as aforementioned, it is to be understood that the invention is capable of use in various other combinations and environments and is capable of changes or modifications within the scope of the inventive concept as expressed herein.

What is claimed is:

1. A method of compiling instructions for a processor, said processor being a very-long-instruction-word processor, wherein said processor comprises:

a plurality of input registers, each respective one thereof being capable of supplying a respective one of a plurality of input data of M bits wide; and a destination register capable of storing output data of M bits wide; and wherein the method comprises:

determining a set of operations for being executed in parallel by the processor on the plurality of input data, the set of operations include at least one multimedia-specific operation;

determining that at least a specific one of the input data comprises specific multiple operand data, each N bits wide, wherein N is smaller than M;

determining that the specific multiple operand data be supplied via a specific one of the input registers; and determining that a result per operation involving any of the N bit wide operand data be stored in the destination register as an N bit wide output data.

2. The method of claim 1, wherein said specific one of the input data comprises first and second operand data of N bits each, and another of said input data comprises third and fourth operand data of N bits each; and the determining the set of operations comprises:

adding the first and third operand data to produce a first result of N bits and adding the second and fourth operand data to produce a second result of N bits;

clipping each respective result into a specified range to produce respective clipped results, each clipped result being N bits; and storing together the respective clipped results in said destination register.

3. The method of claim 1, wherein said specific one of the input data comprises two operand data of N bits each; and the determining the set of operations comprises:

computing an absolute value of each of the two operand data, each computation producing a respective absolute value of N bits;

clipping each respective absolute value into a specified range to produce respective clipped results, each clipped result being N bits; and storing the respective clipped results together in said destination register.

4. The method of claim 1, wherein said specific one of the input data comprises first and second operand data of N bits each, and another of said input data comprises third and fourth operand data of N bits each; and the determining the set of operations comprises:

multiplying the first and third operand data to produce a first product and multiplying the second and fourth operand data to produce a second product, the first and second products each comprising N bits;

clipping each respective product into a specified range to produce respective clipped results, each clipped result comprising N bits; and storing the respective clipped results together in said destination register.

5. The method of claim 1, wherein said specific one of the input data comprises first and second operand data of N bits each, and another of said input data comprises third and fourth operand data of N bits each; and the determining the set of operations comprises:

subtracting the first operand data from the third operand data to produce a first difference and subtracting the second operand data from the fourth operand data to produce a second difference, the first and second differences each comprising N bits;

clipping the first difference and the second difference into a specified range to produce respective clipped results, each clipped result comprising N bits; and storing the respective clipped results together in said destination register.

6. A computer program for execution on a computer with a processor, said processor being a very-long-instruction-word processor, wherein said processor comprises:
a plurality of input registers, each respective one thereof being capable of supplying a respective one of a plurality of input data of M bits wide; and
a destination register capable of storing output data of M bits wide;
at least a specific one of the input data comprising specific multiple operand data, each N bits wide, wherein N is smaller than M; and
wherein the program comprises instructions for a set of operations for execution in parallel by the processor on the plurality of input data, the set of operations include at least one multimedia-specific operation, the instructions comprising:
loading the specific multiple operand data, each N bits wide, in a specific one of the input registers; and
storing a result per operation involving any of the N bit wide operand data in the destination register as an N bit wide output data, clipped results, each clipped result being N bits; and
storing together the respective clipped results in said destination register.

7. The computer program of claim 6, wherein said specific one of the input data comprises first and second operand data of N bits each, and another of said input data comprises third and fourth operand data of N bits each; and wherein the instructions further comprise:
adding the first and third operand data to produce a first result of N bits and adding the second and fourth operand data to produce a second result of N bits;
clipping each respective result into a specified range to produce respective clipped results, each clipped result being N bits; and
storing together the respective clipped results in said destination register.

8. The computer program of claim 6, wherein said specific one of the input data comprises two operand data of N bits each; and wherein the instructions further comprise:
computing an absolute value of each of the two operand data, each computation producing a respective absolute value of N bits;
clipping each respective absolute value into a specified range to produce respective clipped results, each clipped result being N bits; and
storing the respective clipped results together in said destination register.

9. The computer program of claim 6, wherein said specific one of the input data comprises first and second operand data of N bits each, and another of said input data comprises third and fourth operand data of N bits each; and wherein the instructions further comprise:
multiplying the first and third operand data to produce a first product and multiplying the second and fourth operand data to produce a second product, the first and second products each comprising N bits;
clipping each respective product into a specified range to produce respective clipped results, each clipped result comprising N bits; and
storing the respective clipped results together in said destination register.

10. The computer program of claim 6, wherein said specific one of the input data comprises first and second operand data of N bits each, and another of said input data comprises third and fourth operand data of N bits each; and wherein the instructions further comprise:
subtracting the first operand data from the third operand data to produce a first difference and subtracting the second operand data from the fourth operand data to produce a second difference, the first and second differences each comprising N bits;
clipping the first difference and the second difference into a specified range to produce respective clipped results, each clipped result comprising N bits; and
storing the respective clipped results together in said destination register.

11. A method of executing a computer program on a processor, said processor being a very-long-instruction-word processor, wherein said processor comprises:
a plurality of input registers, each respective one thereof being capable of supplying a respective one of a plurality of input data of M bits wide; and
a destination register capable of storing output data of M bits wide;
wherein at least a specific one of the input data comprises specific multiple operand data, each N bits wide, wherein N is smaller than M; and
the processor is capable of executing a set of operations in parallel on the plurality of input data, the set of operations include at least one multimedia-specific operation;
the method comprising:
loading the specific multiple operand data, each N bits wide, in a specific one of the input registers; and
storing a result per operation involving any of the N bit wide operand data in the destination register as an N bit wide output data.

12. The method of claim 11, wherein said specific one of the input data comprises first and second operand data of N bits each, and another of said input data comprises third and fourth operand data of N bits each; and wherein the method further comprises:
adding the first and third operand data to produce a first result of N bits and adding the second and fourth operand data to produce a second result of N bits;
clipping each respective result into a specified range to produce respective clipped results, each clipped result being N bits; and
storing together the respective clipped results in said destination register.

13. The method of claim 11, wherein said specific one of the input data comprises two operand data of N bits each; and wherein the instructions further comprise:
computing an absolute value of each of the two operand data, each computation producing a respective absolute value of N bits;
clipping each respective absolute value into a specified range to produce respective clipped results, each clipped result being N bits; and
storing the respective clipped results together in said destination register.

14. The method of claim 11, wherein said specific one of the input data comprises first and second operand data of N bits each, and another of said input data comprises third and fourth operand data of N bits each; and wherein the method further comprises:
multiplying the first and third operand data to produce a first product and multiplying the second and fourth operand data to produce a second product, the first and second products each comprising N bits;

clipping each respective product into a specified range to produce respective clipped results, each clipped result comprising N bits; and storing the respective clipped results together in said destination register.

15. The method of claim 11, wherein said specific one of the input data comprises first and second operand data of N bits each, and another of said input data comprises third and fourth operand data of N bits each; and wherein the method further comprises:

subtracting the first operand data from the third operand data to produce a first difference and subtracting the second operand data from the fourth operand data to produce a second difference, the first and second differences each comprising N bits;

clipping the first difference and the second difference into a specified range to produce respective clipped results, each clipped result comprising N bits; and storing the respective clipped results together in said destination register.

* * * * *